United States Patent
Montague

[19]

[11] Patent Number: 6,135,478
[45] Date of Patent: Oct. 24, 2000

[54] FOLDABLE BICYCLE FRAME

[76] Inventor: Harry D. Montague, 9 Osborne Rd., Brookline, Mass. 02446

[21] Appl. No.: 09/171,028
[22] PCT Filed: Apr. 8, 1996
[86] PCT No.: PCT/US96/04179
§ 371 Date: Jan. 14, 1999
§ 102(e) Date: Jan. 14, 1999
[87] PCT Pub. No.: WO97/37886
PCT Pub. Date: Oct. 16, 1997
[51] Int. Cl.[7] .................................................... B62K 15/00
[52] U.S. Cl. ............................................ 280/287; 280/278
[58] Field of Search ...................................... 280/287, 278

[56] References Cited

U.S. PATENT DOCUMENTS

| | | |
|---|---|---|
| 413,415 | 10/1889 | O'Brien . |
| 4,022,485 | 5/1977 | Cox ........................................ 280/287 |
| 4,182,522 | 1/1980 | Ritchie ..................................... 280/278 |
| 4,448,437 | 5/1984 | Montague ................................. 280/287 |
| 4,900,047 | 2/1990 | Montague et al. ....................... 280/278 |
| 4,995,626 | 2/1991 | Montague . |
| 5,135,246 | 8/1992 | Montague ................................. 280/231 |
| 5,222,751 | 6/1993 | Chen ........................................ 280/278 |
| 5,282,639 | 2/1994 | Chen ........................................ 280/231 |
| 5,419,573 | 5/1995 | Kao .......................................... 280/278 |
| 5,440,948 | 8/1995 | Cheng ...................................... 74/551.3 |
| 5,558,349 | 9/1996 | Rubin ....................................... 280/287 |

FOREIGN PATENT DOCUMENTS

| | | |
|---|---|---|
| 1415802 | 2/1966 | France . |
| 1419763 | 2/1966 | France . |

*Primary Examiner*—Paul N. Dickson
*Assistant Examiner*—Deanna Draper
*Attorney, Agent, or Firm*—Sughrue, Mion, Zinn, Macpeak & Seas, PLLC

[57] ABSTRACT

A foldable bicycle comprises a front frame (1), a rear frame (21), and a seat tube (20). The front frame (1) and the rear frame (21) are foldable with respect to each other. In a first aspect, a single release clamp (12) releases the front frame from the rear frame in a single operation. This occurs by having the seat tube (20) slotted at the top (11). In a second aspect, the crank housing (34) is positioned in axial alignment with the seat tube (20) and one point (14) of folding occur below the crank housing. This aspect pertains to both a men's and a women's frame.

11 Claims, 2 Drawing Sheets

FOLDABLE BICYCLE FRAME

BACKGROUND OF THE INVENTION

1. Field of the Invention

This invention relates to a foldable bicycle that employs a minimum number of quick release clamps to lock the frames in the open position and additionally to adjust the seat tube height. Quick releases attached to collars joined to the top and bottom tubes secure both the front and back frame and the seat post position.

This invention also relates to a folding frame configuration having an in-line crank housing to permit the use of the standard method of attachment of the front Derailleur. The in-line configuration uses a front frame (mens or women's) collared onto a complete triangle back frame with a standard locking release clamps. The bottom collar is located below the crank housing.

In particular, in accordance with the first aspect of this invention the bicycle has rigid front and rear frames collared together with a unique locking device at the top.

2. Prior Art

The number of techniques to fold a strong frame collapsible bicycle have in the past determined the usefulness of the product, those with fewer steps being far more practical and marketable. Prior to this invention, many bicycles such as the DaHon, U.S. Pat. No. 4,067,589, involved many folding steps, one step always being to lower the seat tube during folding as a discreet operation. The present inventor in U.S. Pat. No. 4,448,437 defined a construction with a separate step to lower the seat tube but, with an overall simplified folding operation. A few bicycles such as the Bridgestone "Grandtech", U.S. Pat. No. 4,579,360 involved few steps but had to sacrifice the strength of the open bicycle by distorting the seat post to achieve the limited number of folding steps. However, even in this configuration, the seat tube still must be separately lowered. U.S. Pat. 4,448,437 established for the first time the concentric seat post technology as commercially viable and that patent is expressly incorporated herein by reference. Bicycles employing that basic geometry have been sold commercially for over ten years and represent a basic technological advancement in foldable bicycles.

A development of that basic technology is defined in U.S. Pat. No. 4,900,047 which employed a binder bolt mechanism to lock the foldable frames in a rigid open condition. Despite these improvements there still exists in the bicycle industry a need for a frame system that minimizes the number of components yet maintains the frame in a rigid and stable condition when opened, to provide a safe yet comfortable bicycle. In that regard the rigidness of the frame in the open condition ultimately determines the suitable of the bicycle as a riding system. consequently, the desire to provide increased utility by folding and to reduce components, to thereby reduce costs and mechanical problems, is contradictory to providing a rigid frame when in the open position. For example, Italian Pat. 26,352 illustrates a folding collared configuration however separate clamps are required to position the seat. Moreover, given the location of the crank, below the lower collar section, an undue stiff riding geometry exists due to the steep seat tube angle. Additionally, the rear frame cannot fold completely within the front frame thus, a compact design does not result.

Within this technology, the technique of providing complete folding or nesting has been to offset the crank housing. This permits the frames to nest but carries the difficulty of not being able to use standard attachment techniques for the front Derailleur. Additional attachment pieces have been necessary and the offset has required special adjustment of the chain guides which permit lateral movement of chain in that gear system.

SUMMARY OF THE INVENTION

It is the object of this invention to define a foldable bicycle that utilizes the minimum locking elements with a hinging concentric seat tube to achieve the rigid frame necessary in the open position and a rigid seat position. In accordance with this invention, the single locking element is positioned at the top of the seat post. It combines a quick release clamp for the seat post and the quick release concentric folding restraining device into one clamp. This eliminates the need for a second clamp. The front frame is collared onto the seat tube member of the rigid back frame. This collar has a slit on the back side so that when the quick release clamp is tightened it squeezes the seat tube. This compression maintains the frame in the locked open position of the bicycle. In the upper section where this collared device is attached the seat tube is also slotted so when the quick release, attached to the front frame, is squeezed it exerts pressure on the seat post as well as the seat tube. This pressure locks the seat post position as well as the front and rear frame positions.

Both the top and bottom collar sections have U-shaped slots to permit maximum distortion when the quick releases are tightened, In the men's embodiment, the top collar section must be at the top end of the seat tube so that the seat tube slot is also U shaped, open at its end to permit the maximum deformity of the seat tube. If the seat tube slot was not U-shaped as the collared section covering it, then the double slotted top collared of this invention would not secure the seat post as well as the front frame. Thus the folding process is achieved expeditiously by releasing of only one quick releases at the top in lieu of two as was the case in the prior art.

The bicycle frame in accordance with a second aspect of the present invention is made up of two interlocking frames, front one formed by the head tube, top and down tube plus the two seat tube collars, in the case of the men's bicycle. The back frame is made up of the seat tube, seat and chain stays. When the front frame is collared onto the back frame each of the frames become a complete enclosing geometry. The front triangular frame, to conform to standard bicycle positioning geometry, is always larger than the rear triangular frame. Each collared section of the front frame is banded between top and bottom rings welded to the seat tube of the back frame. This keeps the collared sections from moving up or down on the seat tube.

In the embodiment comprising the women's bicycle, the front frame comprises an angled top tube such that the top and down tubes are collared proximate to the crank housing.

In the present preferred embodiments of this second aspect of the invention the crank housing is placed above the lower collar section on the back frame. This enables the standard attachment of the seat stays to crank housing with the smaller, rear frame section. In the folded position of the men's embodiment the smaller rear frame fits neatly within the front frame, both the chain and seat stays not hitting the bottom and top tube when folded.

DESCRIPTION OF THE PREFERRED EMBODIMENTS

Figure 1:
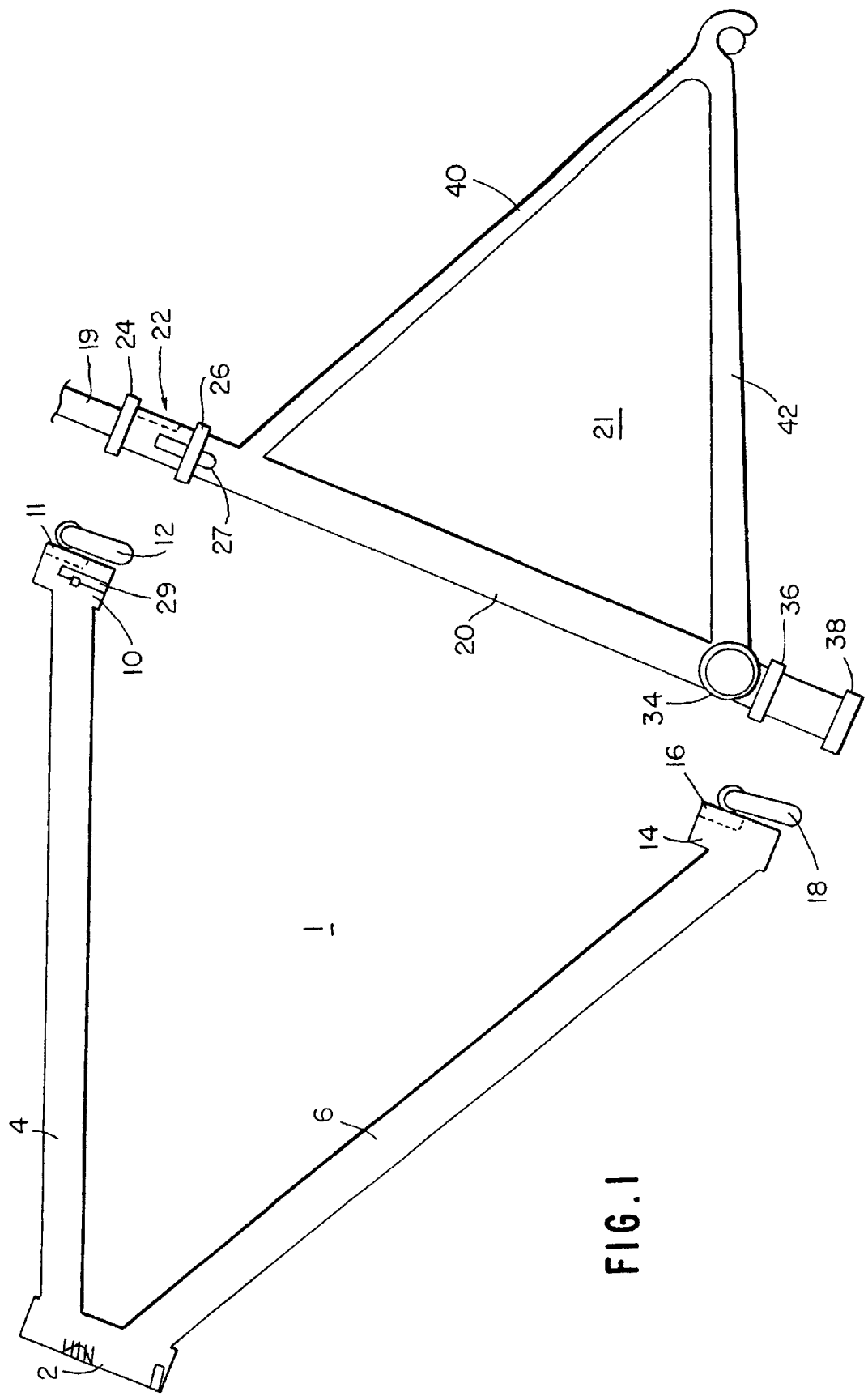
FIG. 1 is a side view of a mens's bicycle frame in accordance with a first and second aspects of this invention.

Referring now to FIG. 1 the fundamental rigid frame configuration of a men's frame with the larger front frame collared onto the smaller back frame is depicted. The important characteristic of this invention is the collared system used to interlock the frame members is combined with their placement. In FIG. 1 the front frame member 1 is comprised of a head tube 2, a top tube 4, a down tube 6 and seat tube collars 10 and 14. In accordance with this invention, each of these collars has a slot or cut which allows the collar to reduce its circumference and apply compressive pressure on the seat tube. The slots are identified in FIG. 1 as elements 11 and 16. Additionally, the seat tube 20 has a cut or slot 22 at the top for the purpose of applying a compressive force to lock the seat post 19 into position as the clamp is engaged. The back frame 21 is comprised of a continuous seat tube 20 housing a crank bracket 34 joined to chain stays 42, with the seat tube joined at the top to the seat stays 40. All these members are constructed using conventional bicycle technology by welding tubular elements to form a rigid construction.

It is understood, but not illustrated, that as in a standard conventional bicycle, in the front frame of this invention the head tube houses a concentric handle bar stem, handle bars, controls, front fork brakes, wheels, etc. In the back frame, not illustrated is the seat, chain, cranks, pedals, chain rings, front and rear DERAILLEUR, brakes, cables, etc.

In the front frame 1, the seat tube collars 10 and 14 have the standard quick releases 12 and 18 squeezing the slots 11 and 16. When the front frame collar 10 is squeezed by means of the quick release 12, it clamps onto the seat post between the collar rings 24 and 26 to form the rigid frame. At the same time it also squeezes the slot 22 at the top of the seat tube 20. This simultaneously clamps the seat post 19 into a locked position. It will be appreciated that for purposes of reducing the size of the bicycle when in the folded position, the seat will be lowered or removed. Thus the ability to lock in a one step operation represents an improvement in terms of set-up (or folding) time.

The front frame collars are locked vertically in place by the rings 24, 26, 36, 38 welded to the seat tube 20. In the preferred embodiment, when a safety device is used, the ring 26 is replaced with the semi-circular guide track and safety pin housing 27 used with safety device 29. This is similar to this described in U.S. Pat. No. 4,900,047.

The folding operation in accordance with the present invention will now be described. The first step in the folding operation involves releasing the quick releases 12 and 18. The combined quick release 12 releases the bind between the front frame 1 and the back frame 21 and also the bind between the seat tube 20 and the seat post 19. The seat post 19 and seat are removed. Next the front wheel is removed and the safety device is retracted while the front frame 1 is folded around to the back frame 21. When this completed, the front frame section 1, which includes also the front fork and the handle bars are then pressed tight against the rear frame 21, In addition, as any non-folding bicycle, this bicycle can be outfitted with conventional accessories, water bottle, luggage racks lights, etc.

The second aspect of this invention pertains the location of the crank housing relative to the frame elements. Referring first to FIG. 1 it will be appreciated that the collar 14 is located below the crank housing 34. That is, unlike prior configurations, the crank housing is not located at the lowest point on the seat tube. This positioning of the crank housing permits the use of conventional front Derailleur attachment components for both men's and women's frames. Additionally, in this aspect of the invention, the crank housing 34 is positioned in-line with both the seat tube 20 and the chain stay 42 while at the same time above the lowest point of frame rotation (collar 14). In the contest of the men's frame, this permits nesting of the front and rear frames 1 and 21.

Figure 2:
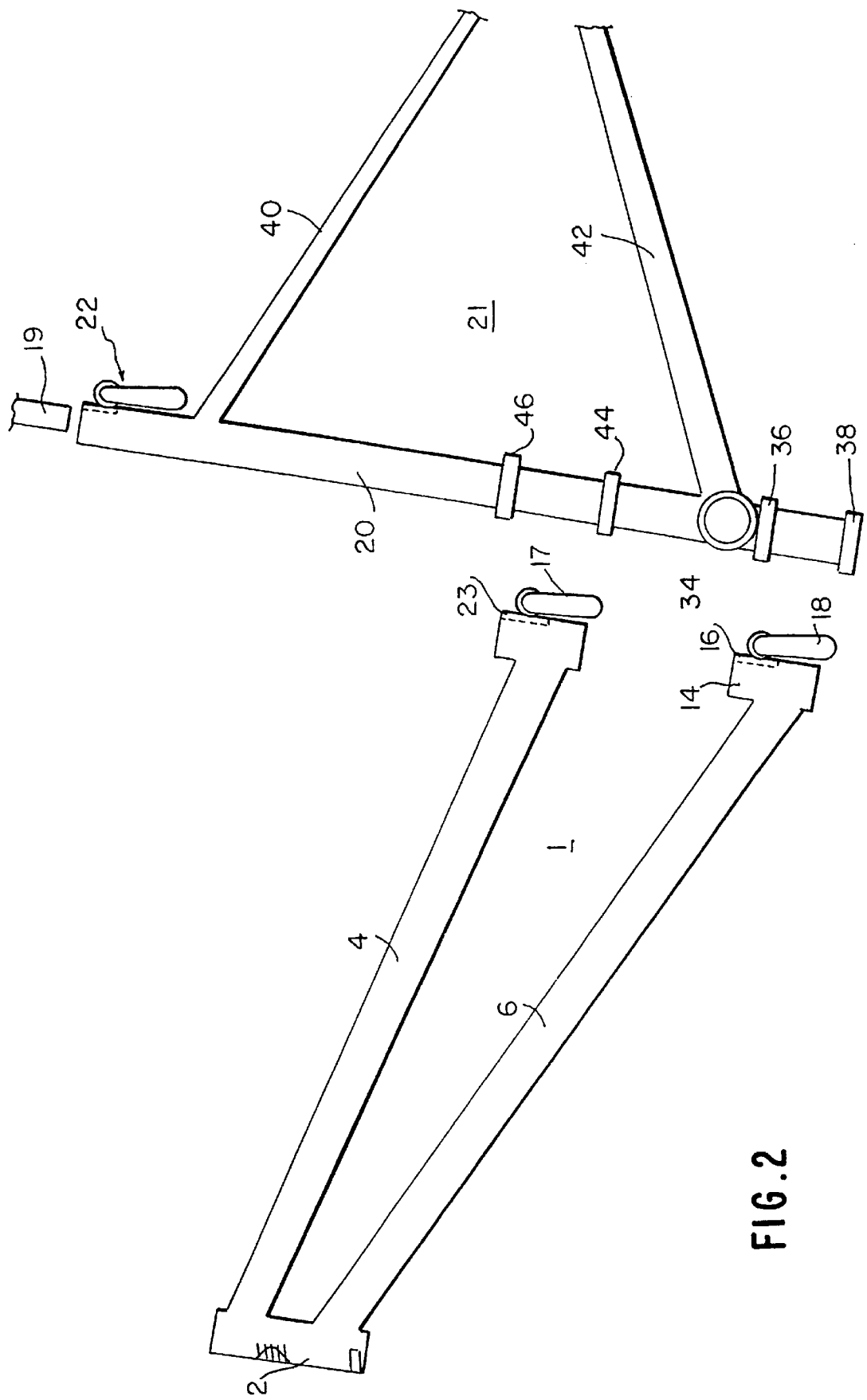
FIG. 2 is a side view of a women's bicycle frame in accordance with the second aspect of this invention.

Referring now to FIG. 2, the women's frame according to this second aspect of the invention is illustrated. It will be appreciated that corresponding elements are given the same numerals and that the same essential discussion of the those common components applies equally to this embodiment of the second aspect of the invention. In this embodiment the top frame 4 is lowered to define the basic geometry of a front frame for a women's bicycle. Each of the top and down tubes 4 and 6 have slots 23 and 16 and quick releases 17 and 18. The collar rings 44, 46 for the top tube, and those for the bottom tube 36, 38 are positioned to bracket the respect collars. Additionally, the crank housing 34 is positioned above the lower collar rings 36, 38. As illustrated in FIG. 2 the crank housing 34 is also in-line with the seat tube 20 and the chain stays 42.

It is apparent from both FIGS. 1 and 2 that the crank housing 34 in located in the proper geometric position so that the alignment with both the chain stays 42 and the seat post 20 is maintained. In prior folding geometries the crank housing was located either at the bottom of the seat tube (and not aligned with the chain stays) or was a welded attachment to the rear frame (and thus not aligned with the seat tube). Moreover, when the crank housing is positioned at the bottom of the seat tube is it not centered on the folding line of the frames so that complete folding could not be accomplished.

It is apparent that modifications of this invention can be accomplished within the scope of this invention. For example, in the first aspect of this invention dealing with simultaneous clamping of the frames and the seat post, the men's frame may position the crank housing below the lower collar section such as in Turheimer, Italian Pat, No. 26,352. When this is accomplished, the seat tube angle can be made steeper for a stiffer riding geometry. However, care must be taken in the geometry so that the chain stays do not hit the bottom tube until the farthest point away from the seat tube, thus permitting the tightest fold possible for this embodiment. It will appreciated that while the clamping feature is maintained the ability to completely fold will be lost.

In yet another alternative embodiment it is possible for the collaring sections to be made up of a spiraling geometry so that the front frame spiral vertically downward during the folding process. This also permits a steeper seat post for a stiffer riding geometry, the front frame sliding downward to miss hitting the rear axial point during the folding process, In the men's frame the position of the top collared section is always above the intersection of the seat stays and the seat tube.

I claim:

1. A foldable bicycle comprising; a front frame, a rear frame, a seat tube, said front frame and said rear frame foldable with respect to each other, said rear frame comprising said seat tube, seat stays and chain stays, a crank housing spaced above a lower terminal end of the seat tube, with a pivot axis of the crank housing intersecting the longitudinal axis of the seat tube, and wherein the front frame folds about said seat tube at a point below said crank housing.

2. A foldable bicycle of claim 1 wherein said front frame and said rear frame have concentric positions about said seat tube.

3. A foldable bicycle of claim 2 wherein said rear frame is a integral closed frame.

4. A foldable bicycle of claim 3 wherein said rigid front frame has a substantially horizontal top tube defining a men's frame and said top tube and a bottom tube each have a collar mounted concentric about the seat tube to form a ridable configuration, each of said collars having a slot to compress said collar against said seat tube.

5. A foldable bicycle of claim 1 wherein comprising means to release comprise quick release clamps to lock said front and rear frames in a rigid unfolded configuration and one of said quick release clamps simultaneously locks said seat post into position.

6. A foldable bicycle of claim 5 further comprising a safety pin placed on the seat tube.

7. The folding bicycle of claim 1 wherein said chain stays are aligned with said crank housing.

8. The folding bicycle of claim 1 wherein said front frame comprises a substantially horizontal top tube defining a men's frame.

9. The folding bicycle of claim 8, wherein said seat tube has a slot at its upper end, quick release means associated with said front frame and said slot to simultaneously clamp said front and rear frames and a seat post in one operation.

10. The folding bicycle of claim 1 wherein said front frame comprises an substantially angled top tube defining a women's frame.

11. The folding bicycle of claim 10, wherein said front frame comprises a pair of collars mounted on said seat tube at positions above and below and proximate to said crank housing.

* * * * *